J. C. SMITH.
RECTIFYING APPARATUS.

No. 174,867.

Patented March 14, 1876.

Witnesses
Harry Howson Jr
Harry Smith

Joseph C. Smith
by his Attorneys
Howson and Son

UNITED STATES PATENT OFFICE.

JOSEPH C. SMITH, OF PHILADELPHIA, PENNSYLVANIA, ASSIGNOR OF ONE-HALF HIS RIGHT TO GEORGE W. MIDDLETON, OF SAME PLACE.

IMPROVEMENT IN RECTIFYING APPARATUS.

Specification forming part of Letters Patent No. 174,867, dated March 14, 1876; application filed February 21, 1876.

*To all whom it may concern:*

Be it known that I, JOSEPH C. SMITH, of Philadelphia, Pennsylvania, have invented an Improvement in Rectifying Apparatus, of which the following is a specification:

The object of my invention is to insure the thorough percolation of liquid spirit through masses of filtering material contained in separate chambers in a rectifying apparatus; and this object I attain in the manner which I will now proceed to describe, reference being had to the accompanying drawing, in which—

Figure 1:
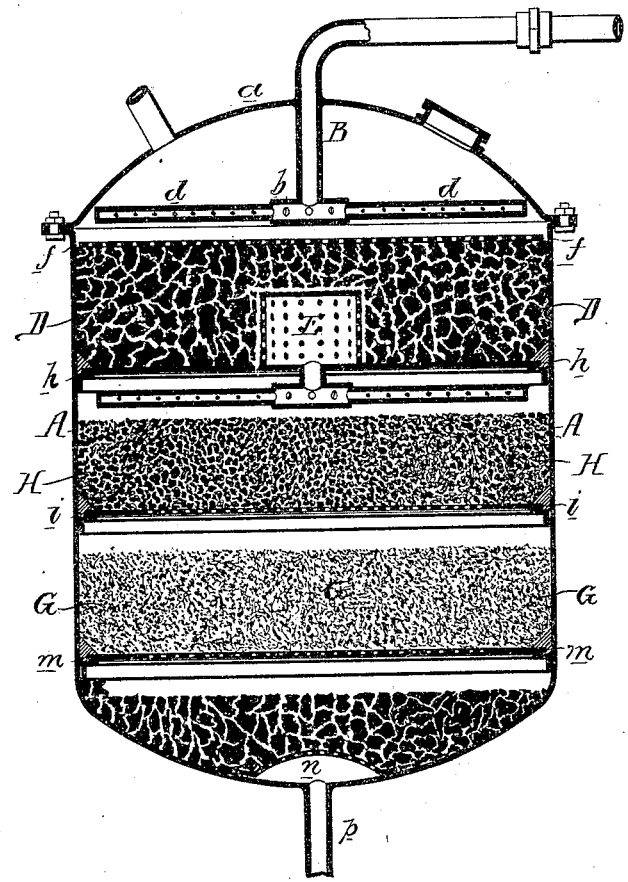
Figure 2:
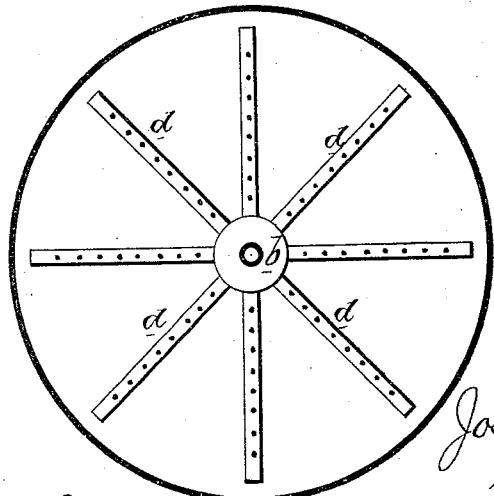

Figure 1 is a vertical section of the rectifying apparatus, and Fig. 2 a sectional plan on the line 1 2.

The outer cylindrical casing A of the rectifying apparatus is surmounted by a removable cover, a, through the center of which passes a pipe, B, communicating with an elevated reservoir containing the crude spirit, or with a pump, and terminating in a central chamber, b, from which radiate a number of perforated tubes, d, closed at their outer ends, so that the spirit will pass in a number of small streams over the entire surface of a perforated plate, f, which rests on a mass of charcoal, D, supported on a diaphragm, h, which rests on ledges or brackets in the interior of the casing. The spirit, after percolating through this mass of charcoal, must pass through the perforated walls of a central chamber, E, on the above-mentioned diaphragm h, and thence into a series of radial tubes, similar to those above referred to, and from these tubes in small widely-disseminated streams onto a mass of charcoal, H, supported, in the present instance, by a centrally-perforated diaphragm, i, which also rests on a ledge or bracket in the casing. As the spirit passes through the perforations of this diaphragm i, it falls onto a third mass of charcoal, G, supported by another centrally-perforated diaphragm, m, and as the spirit passes through the perforations of this diaphragm it falls into the lowest chamber I of the casing, and passes thence through a final layer of filtering material and a perforated or wire-gauze plate, n, into the discharge-pipe p, which it leaves in the desired rectified condition.

It should be understood that the highest mass of granulated charcoal is comparatively coarse, the next somewhat finer, and the lowest still finer, a plan which insures the lasting of the charcoal and a more thorough rectifying of the spirits than when only one mass is used.

I wish it to be understood that I do not desire to claim in this application the distributing-pipe B and arms d, nor the centrally-perforated diaphragms i and m, as these form the subject of a separate application for a patent made by me, and now pending; but

I claim as my invention—

The diaphragm h, separating two filtering-chambers within a casing, A, and provided above with a central perforated casing surrounding a chamber, E, which communicates with a perforated distributer below the diaphragm, substantially as set forth.

In testimony whereof, I have signed my name to this specification, in the presence of two subscribing witnesses.

JOSEPH C. SMITH.

Witnesses:
HARRY HOWSON, Jr.,
HARRY SMITH.